United States Patent [11] 3,594,903

[72] Inventor Jean Schluchter
  79, Route de Saint-Julien, Geneva, Switzerland
[21] Appl. No. 804,786
[22] Filed Mar. 6, 1969
[45] Patented July 27, 1971
[32] Priority Mar. 6, 1968
[33] Switzerland
[31] 3421/68

[54] PRUNING APPARATUS
  3 Claims, 3 Drawing Figs.
[52] U.S. Cl. .................................................. 30/249
[51] Int. Cl. ............................................. B26b 13/26
[50] Field of Search ............................................ 30/246, 248, 249; 56/333, 334, 335

[56] References Cited
UNITED STATES PATENTS

| | | | |
|---|---|---|---|
| 1,801,675 | 4/1931 | Maguire .................... | 30/249 X |
| 2,504,405 | 4/1950 | Fletcher .................... | 30/249 |
| 2,957,297 | 10/1960 | Zoetemelk ................. | 30/248 X |
| 3,317,997 | 5/1967 | Hedstrom .................. | 30/248 |
| 3,496,710 | 2/1970 | Smith ........................ | 30/248 X |

Primary Examiner—Robert C. Riordon
Assistant Examiner—J. C. Peters
Attorney—Raymond A. Robic ABSTRACT: This invention relates to a pruning apparatus comprising a pole; pruning scissors mounted on one end of said pole, said pruning scissors being rotatable around an axis of rotation substantially perpendicular to said pole; and means including a control handle located at the other end of said pole for actuating said pruning scissors in such a way that the actuation of the pruning scissors is independent of their angular position about said axis of rotation.

PATENTED JUL 27 1971          3,594,903

INVENTOR
Jean SCHLUCHTER

ATTORNEY

PRUNING APPARATUS

This invention relates to a pruning apparatus permitting more particularly to cut the lower stems of trees without using a ladder and without getting tired while ensuring a precise and easy access to the stems to be cut.

The apparatus in accordance with the invention comprises a pole; pruning scissors mounted on one end of said pole, said pruning scissors, being rotatable around an axis of rotation substantially perpendicular to said pole; and means including a control handle located at the other end of said pole for actuating said pruning scissors in such a way that the actuation of the pruning scissors is independent of their angular position about said axis of rotation.

The invention will now be disclosed with reference to the accompanying drawings illustrating, by way of example, an embodiment of the invention. In the drawings.

Figures 1, 2, 3:
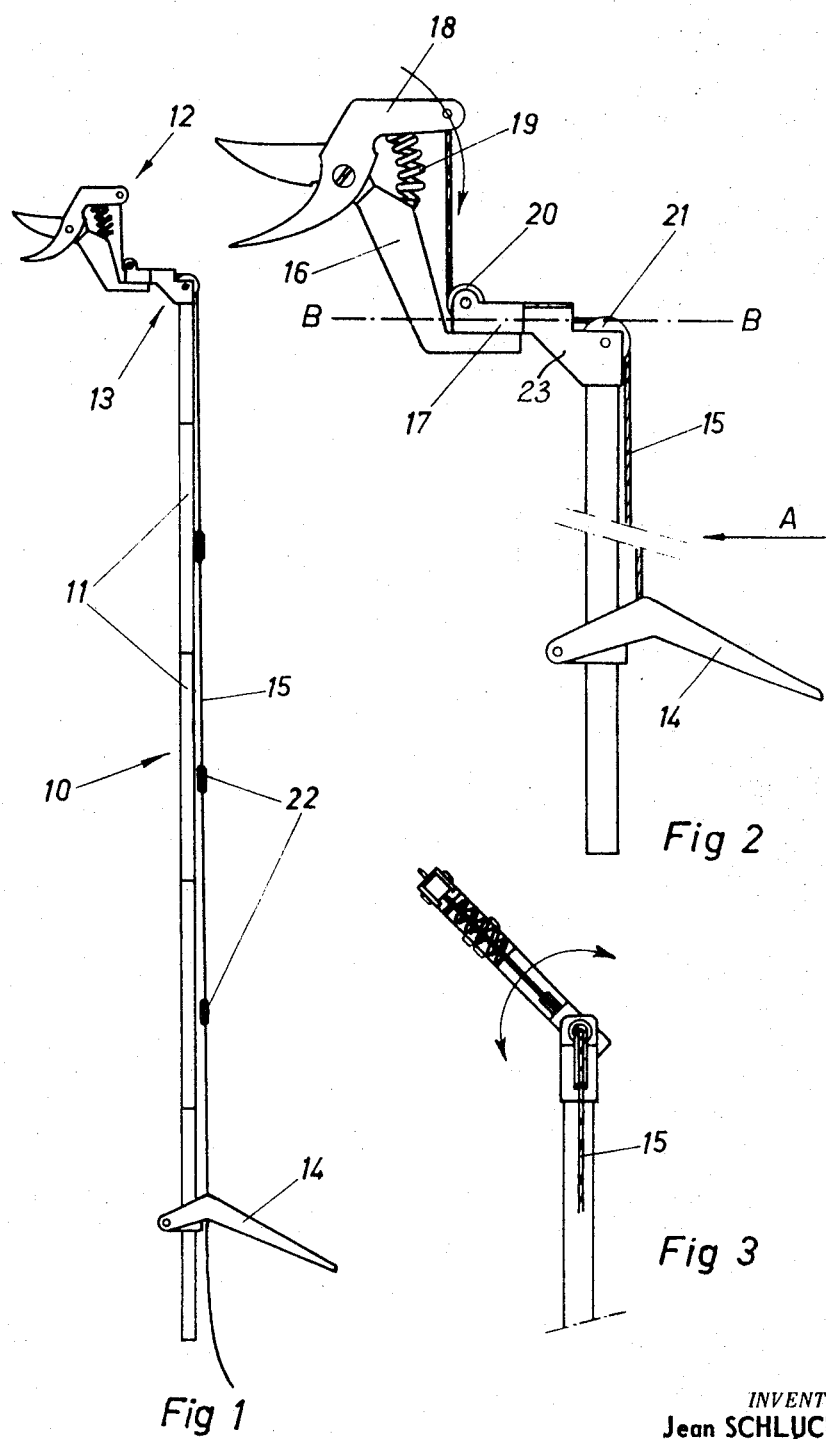
FIG. 1 illustrates a side view of the pruning apparatus in accordance with the invention.
FIG. 2 is an enlarged view of the same apparatus illustrating the upper and lower portions thereof.
FIG. 3 is a side view in the direction of arrow A of FIG. 2.

The apparatus illustrated in the drawings comprises a pole 10 formed of several tubular elements removably inserted in one another, pruning scissors mounted on the upper extremity of the last tubular element of the pole through an articulating arrangement 13, and a device for controlling the pruning scissors including a control handle 14 mounted on the lower tubular element of the pole and a cable 15 interconnecting the control handle and the prining scissors, the securing of the cable to the handle being obtained by cylindrical stop members 22 attached to the cable and adapted to engage a slot in the handle.

The pruning scissors 12 comprise a first branch 16 secured to a rotatable member 17 forming part of articulation arrangement 13, a mobile branch 18 to which the end of cable 15 is attached, and a spring 19 which is adapted to hold the two branches of the pruning scissors apart.

The cable 15 rides on pulleys 20 and 21, the first one of which is mounted on the rotatable member 17 and the second one of which is mounted on a fixed member 23 forming part of articulation arrangement 13.

The diameters of the two pulleys and the positions of their axes are arranged in such a way that the section of the cable between the two pulleys coincide exactly with the horizontal axis B-B around which the pruning scissors rotate.

The result of the above arrangement is that the pull transmitted by the cable to the mobile branch of the pruning scissors is independent of the cutting angle thereof and depends only on the action of the control handle 14.

I claim:

1. A pruning apparatus comprising: a pole; a fixed member secured to one end of said pole and supporting a first pulley; a rotatable member mounted for rotation with respect to said first member about an axis of rotation substantially perpendicular to said pole, said rotatable member supporting a second pulley; pruning scissors mounted on said fixed member and including a first branch secured to said rotatable member and a second branch pivotally mounted on said first branch; a control handle located at the other end of said pole; and a cable interconnecting the second branch of said pruning scissors to said control handle for actuating said pruning scissors, said cable passing through said first and second pulleys and the portion of said cable located between said two pulleys coinciding with said axis of rotation, thereby enabling actuation of said pruning scissors substantially perpendicularly to the axis of the pole around an angle of 360°.

2. A pruning apparatus as defined in claim 1 wherein said pole is made of a number of tubular elements removably inserted in one another.

3. A pruning apparatus as defined in claim 2 wherein said pruning scissors are mounted on the first tubular element at one end of said pole and said control handle is mounted on the last tubular element at the opposite end of said pole.